(12) United States Patent
Han et al.

(10) Patent No.: US 7,940,807 B2
(45) Date of Patent: May 10, 2011

(54) METHODS, DECODER CIRCUITS AND COMPUTER PROGRAM PRODUCTS FOR PROCESSING MPEG AUDIO FRAMES

(75) Inventors: Jung-in Han, Gyeonggi-do (KR); Sang-chul Kwon, McLean, VA (US); Sang-wook Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1710 days.

(21) Appl. No.: 10/997,829

(22) Filed: Nov. 24, 2004

(65) Prior Publication Data

US 2005/0111493 A1 May 26, 2005

(30) Foreign Application Priority Data

Nov. 25, 2003 (KR) .................. 10-2003-0084217

(51) Int. Cl.
*H04J 3/06* (2006.01)
(52) U.S. Cl. ........................ 370/509; 370/520
(58) Field of Classification Search .................. 370/509, 370/511, 503, 514, 520
See application file for complete search history.

(56) References Cited

U.S. PATENT DOCUMENTS

| | | | | |
|---|---|---|---|---|
| 5,420,640 A | * | 5/1995 | Munich et al. | 348/525 |
| 5,710,783 A | * | 1/1998 | Luthi et al. | 714/755 |
| 5,757,869 A | * | 5/1998 | Sands et al. | 375/366 |
| 5,771,239 A | * | 6/1998 | Moroney et al. | 370/474 |
| 5,835,165 A | * | 11/1998 | Keate et al. | 375/240.27 |
| 5,901,335 A | * | 5/1999 | Kim | 712/300 |
| 5,963,705 A | * | 10/1999 | Kim et al. | 386/126 |
| 6,154,468 A | * | 11/2000 | Lin et al. | 370/510 |
| 6,226,608 B1 | * | 5/2001 | Fielder et al. | 704/229 |
| 6,400,415 B1 | * | 6/2002 | Danielsons | 348/608 |
| 6,421,647 B1 | | 7/2002 | Li | |
| 6,466,476 B1 | * | 10/2002 | Wong et al. | 365/189.15 |
| 6,470,142 B1 | * | 10/2002 | Isozaki et al. | 386/124 |
| 6,546,065 B1 | | 4/2003 | Shimosakoda | |
| 6,597,740 B2 | * | 7/2003 | Nakamura et al. | 375/240.23 |
| 6,931,371 B2 | * | 8/2005 | Sueyoshi et al. | 704/201 |
| 7,200,670 B1 | * | 4/2007 | Hearn et al. | 709/232 |
| 2002/0026255 A1 | | 2/2002 | Sueyoshi et al. | |

FOREIGN PATENT DOCUMENTS

| | | |
|---|---|---|
| EP | 0 402 973 A1 | 12/1990 |
| EP | 0 700 181 A2 | 3/1996 |
| EP | 1 308 931 A1 | 5/2003 |
| JP | 62112268 | 5/1987 |

(Continued)

OTHER PUBLICATIONS

French Preliminary Search Report for French Application No. 04 12516 mailed on Apr. 27, 2005.

(Continued)

*Primary Examiner* — William Trost, IV
*Assistant Examiner* — Roberta A Shand
(74) *Attorney, Agent, or Firm* — Myers Bigel Sibley & Sajovec (57) ABSTRACT

Methods of searching for a sync word in an MPEG compressed audio bitstream including a plurality of MPEG audio frames can include determining whether first data in the bitstream has a value equal to a sync word value. It can be determined whether the first data is a valid sync word based on a comparison of a plurality of data that are separated in the bitstream from the first data by at least a frame length to the sync word value.

16 Claims, 5 Drawing Sheets

FOREIGN PATENT DOCUMENTS

| | | |
|---|---|---|
| JP | 08-079228 | 3/1996 |
| JP | 09-008794 | 1/1997 |
| JP | 9046321 | 2/1997 |
| JP | 10-209876 | 8/1998 |
| JP | 11-055237 | 2/1999 |
| JP | 2000124815 | 4/2000 |
| JP | 2000-224154 | 8/2000 |
| JP | 2002-518881 | 12/2000 |
| JP | 10209876 | 1/2001 |
| JP | 2001189716 | 7/2001 |
| JP | 2003-162299 | 6/2003 |
| KR | 1997-0060715 | 8/1997 |
| KR | 0217497 | 9/1999 |
| WO | WO 03/036622 A2 | 5/2003 |
| WO | WO 03/036622 A3 | 5/2003 |

OTHER PUBLICATIONS

Notice to Submit a Response for Korean Patent Application No. 10-2003-0084217 mailed on Aug. 22, 2005.

Chinese Office Action (6 pages) corresponding to Chinese Application No. 2004101037781; Mailing Date: Aug. 29, 2008.

English Translation of Chinese Office Action (4 pages) issued on Aug. 29, 2008 corresponding to Chinese Patent Application No. 200410103778.1; Translation Mailing Date: Nov. 17, 2008.

JP First Office Action dated Jul. 13, 2010, JP Patent Application No. 2004-340992, 8 pages.

German Office Action; Mar. 26, 2010; corresponding German Patent Application No. 10 2004 058 476.1-55 (5 pages).

\* cited by examiner

| BITRATE INDEX / Fs | 00 | 01 | 10 | 11 |
|---|---|---|---|---|
| 0000 | N11 | N12 | N13 | N14 |
| 0001 | N21 | N22 | N23 | N24 |
| 0010 | N31 | N32 | N33 | N34 |
| 0011 | N41 | N42 | N43 | N44 |
| 0100 | N51 | N52 | N53 | N54 |
| 1010 | N61 | N62 | N63 | N64 |
| 0110 | N71 | N72 | N73 | N74 |
| 0111 | N81 | N82 | N83 | N84 |
| 1000 | N91 | N92 | N93 | N94 |
| 1001 | N101 | N102 | N103 | N104 |
| 1010 | N111 | N112 | N113 | N114 |
| 1011 | N121 | N122 | N123 | N124 |
| 1100 | N131 | N132 | N133 | N134 |
| 1101 | N141 | N142 | N143 | N144 |
| 1110 | N151 | N152 | N153 | N154 |
| 1111 | N161 | N162 | N163 | N164 |

FIG. 6

METHODS, DECODER CIRCUITS AND COMPUTER PROGRAM PRODUCTS FOR PROCESSING MPEG AUDIO FRAMES

CROSS-REFERENCE TO REALTED APPLICATION

This application claims the priority of Korean Patent Application No. 2003-84217, filed on Nov. 25, 2003, in the Korean Intellectual Property Office, the disclosure of which is incorporated herein in its entirety by reference.

FIELD OF THE INVENTION

The present invention relates to methods, computer program products, and systems for decompressing compressed audio data.

BACKGROUND

Figure 1:
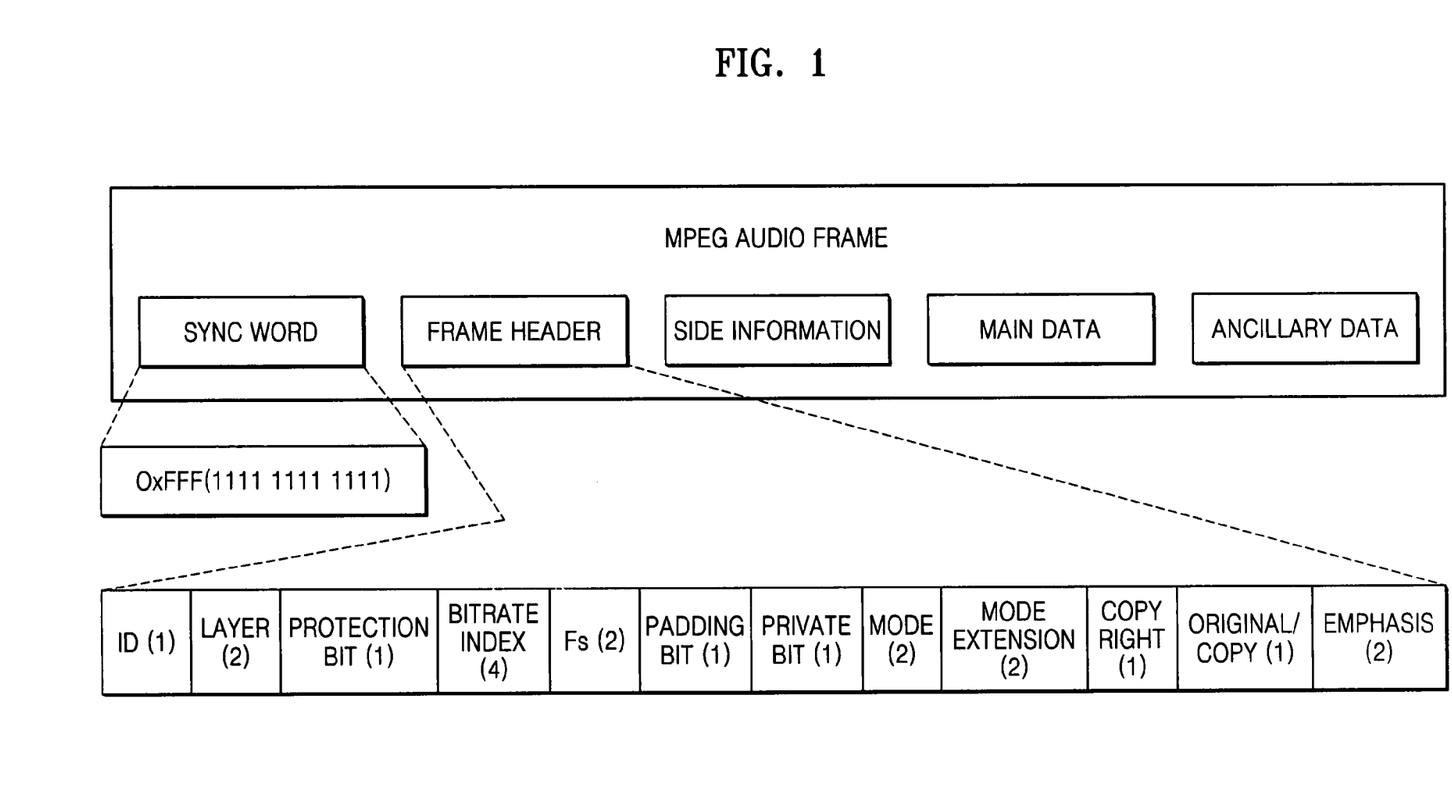
FIG. 1 shows a general Motion Picture Experts Group (MPEG) format audio frame.

FIG. 1 shows an audio frame format (i.e., a frame) associated with standards promulgated by the Motion Picture Experts Group (MPEG) for audio compression and decompression. It will be understood that the term MPEG is also used herein to refer to various for different types of compression and decompression. For example, MPEG1 and MPEG2 are formats promulgated by the Motion Picture Experts Group.

Referring to FIG. 1, the first field is a sync word, which is used to identify the start (or end) of the audio frame. The sync word has a value equal to twelve successive binary digits (or bits) equal to a "1." The sync word value can also be represented by a hexadecimal value of 0xFFF (1111 1111 1111) where, as understood by those skilled in the art, "0x" denotes that the following numbers are in hexadecimal format.

The sync word is followed by a frame header, which includes an identification field ID (1), a layer field LAYER (2), a protection bit field PROTECTION BIT (1), a bitrate index field BITRATE INDEX (4), a sampling frequency field Fs (2), a padding bit field PADDING BIT (1), a private bit field PRIVATE BIT (1), a mode field MODE (2), a mode extension field MODE EXTENSION (2), a copy right field COPY RIGHT (1), an original/copy field ORIGINAL/COPY, and an emphasis field EMPHASIS (2). The number in the parenthesis indicates the number of bits included in each field. MPEG audio frame headers are discussed, for example, on the World Wide Web at codeproject.com/audio/MPEGAudioInfo.asp. These fields are well known in the art so that detailed explanations for the fields are omitted and only the fields related with the present invention are discussed below.

The sampling frequency field Fs is composed of two bits and represents a sampling frequency. In the case of MPEG Layer 3, possible sampling frequencies include 44.1 KHz, 48 KHz, 32 KHz and a reserved frequency when values of the sampling frequency field are 00, 01, 10 and 11, respectively.

The padding bit field PADDING BIT includes one bit and represents whether or not dummy data is included in the frame. When the value of the data in the padding bit field (i.e., the padding bit) is "0," the frame is not padded with dummy data whereas if the padding bit is "1," the frame is padded with dummy data.

In operation, a conventional decoder receives compressed audio data (or a "bitstream") in a series of audio frames and decodes each to reproduce a corresponding audio signal. Accordingly, the conventional decoder searches for the sync word in order to read information from the compressed audio bitstream. However, the sync word value of 0xFFF may not be unique in the compressed audio bitstream in that the compressed audio bitstream can include data having a value equal to the same value as the sync word (i.e., 0xFFF). Accordingly, the conventional decoder may erroneously detect data as a valid sync word, which may increase the sync word detection failure rate.

To address this type of problem, a conventional decoder may refer to the padding bit to assist in the search for the valid sync word. However, if the padding bit is incorrect (e.g., damaged or incorrectly calculated) the conventional decoder may have difficultly in detecting the valid sync word.

SUMMARY

Some embodiments according to the invention can provide methods, decoder circuits and computer program products for processing mpeg audio frames. Pursuant to these embodiments, a method of searching for a sync word in an MPEG compressed audio bitstream including a plurality of MPEG audio frames can include determining whether first data in the bitstream has a value equal to a sync word value. It can be determined whether the first data is a valid sync word based on a comparison of a plurality of data that are separated in the bitstream from the first data by at least a frame length to the sync word value.

In some embodiments according to the invention, the frame length is determined based on a bitrate index field value and/or a sampling frequency field value included in a header associated with the bitstream. In some embodiments according to the invention, the method can further include adding the frame length to a position of the first data in the bitstream to index to second data in the bitstream. The second data can be compared to the sync word value and the third data in the bitstream that is immediately subsequent to the second data can be compared to the sync word value.

In some embodiments according to the invention, the method can further include determining that the first data is the valid sync word if the second data is equal to the sync word value or if the second data is not equal to the sync word value. In some embodiments according to the invention, determining that the first data is the valid sync word if the second data is equal to the sync word value and the third data is equal to the sync word value or if the third data is not equal to the sync word value.

In some embodiments according to the invention, the method can further include determining that the first data is the valid sync word if the second data is not equal to the sync word value and the third data is equal to the sync word value. In some embodiments according to the invention, a method of searching for a sync word in an MPEG compressed audio bitstream including a plurality of MPEG audio frames can include comparing subsequent data included in the bitstream to a sync word value, the subsequent data being offset from a prospective sync word by more than an MPEG audio frame length.

In some embodiments according to the invention, the method can further include determining that the prospective sync word is a valid sync word if the subsequent data is equal to the sync word value. If the subsequent data is not equal to the sync word value, it can be determined that the prospective sync word is the valid sync word if previous data that immediately precedes the subsequent data is equal to the sync word value.

In some embodiments according to the invention, the frame length is determined based on a bitrate index field value and/or a sampling frequency field value included in a header associated with the bitstream. In some embodiments according to the invention, comparing can further include adding the frame length to a position of the prospective sync word in the bitstream to index to the subsequent data in the bitstream and comparing the subsequent data to the sync word value. The third data in the bitstream that is immediately subsequent to the second data can be compared to the sync word value.

In some embodiments according to the invention, a method of searching for a sync word in an MPEG compressed audio bitstream including a plurality of MPEG audio frames can include determining that a prospective sync word is equal to a sync word value in the bitstream and determining an MPEG audio frame length based on a bitrate index field value and/or a sampling frequency field value included in a header associated with the bitstream. Subsequent data offset from the prospective sync word within the bitstream by an amount equal to the MPEG audio frame length can be read and the subsequent data compared to the sync word value. It can be determined that the prospective sync word is a valid sync word if the subsequent data is equal to the sync word value. It can be determined that the prospective sync word is a valid sync word if the subsequent data is not equal to the sync word value and if previous data immediately preceding the subsequent data is equal to the sync word value.

In some embodiments according to the invention, a decoder circuit for searching for a sync word in an MPEG compressed audio bitstream including a plurality of MPEG audio frames can include a decoder circuit configured to compare subsequent data included in the bitstream to a sync word value, the subsequent data being offset from a prospective sync word by more than an MPEG audio frame length.

In some embodiments according to the invention, a computer program product for searching for a sync word in an MPEG compressed audio bitstream including a plurality of MPEG audio frames can include a computer readable medium having computer readable program code embodied therein. The computer readable program product can include computer readable program code configured to determine whether first data in the bitstream has a value equal to a sync word value. Computer readable program code can be configured to determine whether the first data is a valid sync word based on a comparison of a plurality of data that are separated in the bitstream from the first data by at least a frame length to the sync word value.

DESCRIPTION OF EMBODIMENTS ACCORDING TO THE INVENTION

The invention now will be described more fully hereinafter with reference to the accompanying drawings, in which illustrative embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied, for example, as methods, circuits, and/or computer program products. Accordingly, the present invention may take the form of an entirely software embodiment, an entirely hardware embodiment or an embodiment combining software and hardware aspects. Furthermore, the invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more computer systems, or it may execute partly on a server and partly on a client within a client device, or as a proxy server at an intermediate point in a communications network. In the latter scenario, the client device may be connected to a server over a LAN or a WAN (e.g., an intranet), or the connection may be made through the Internet (e.g., via an Internet Service Provider). The invention may be embodied using various protocols over various types of computer networks.

The invention is described below with reference to block diagrams and flowchart illustrations of methods, systems and computer program products according to embodiments of the invention. It is understood that each block of the block diagrams and flowcharts, and combinations of blocks in the block diagrams and flowcharts, can be implemented by computer program instructions. These computer program instructions may be provided to a processor circuit, special purpose computer, or other programmable data processing apparatus to produce a machine, such that the instructions, which execute via the processor circuit or other programmable data processing apparatus, implement the functions specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instructions which implement the function specified in the block diagrams and/or flowchart block or blocks.

The computer program instructions may be loaded into the processor circuit or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

According to some embodiments of the invention, an MPEG audio frame can be decoded without referring to a padding bit included in a header thereof. For example, in some embodiments according to the invention, the MPEG audio frame length can be determined using a number of samples per frame, a bit rate for the frame, and a sampling rate for the audio (which may be included in the MPEG audio frame header).

Contrary to some conventional MPEG decoders, decoders according to some embodiments of the invention may locate valid sync words within the MPEG audio frame without referring to the padding bit included in the MPEG audio frame header. For example, decoders according to some embodiments of the invention may detect first data (which may be a valid sync word) and evaluate whether the first data is a valid sync word by indexing into the MPEG audio bit stream by an amount based on the number of samples per frame, the bit rate, and the sampling rate to retrieve second data (which may be the next sync word). If the second data has a value that is not equal to a sync word, the data which immediately precedes the second data is evaluated to determine whether it has a value that is equal to a sync word. If the preceding data has a value equal to a sync word, it is determined that the first data is a valid sync word, whereas if the preceding data has a value not equal to a sync word, the first data is determined not to be a valid sync word.

Figure 2:
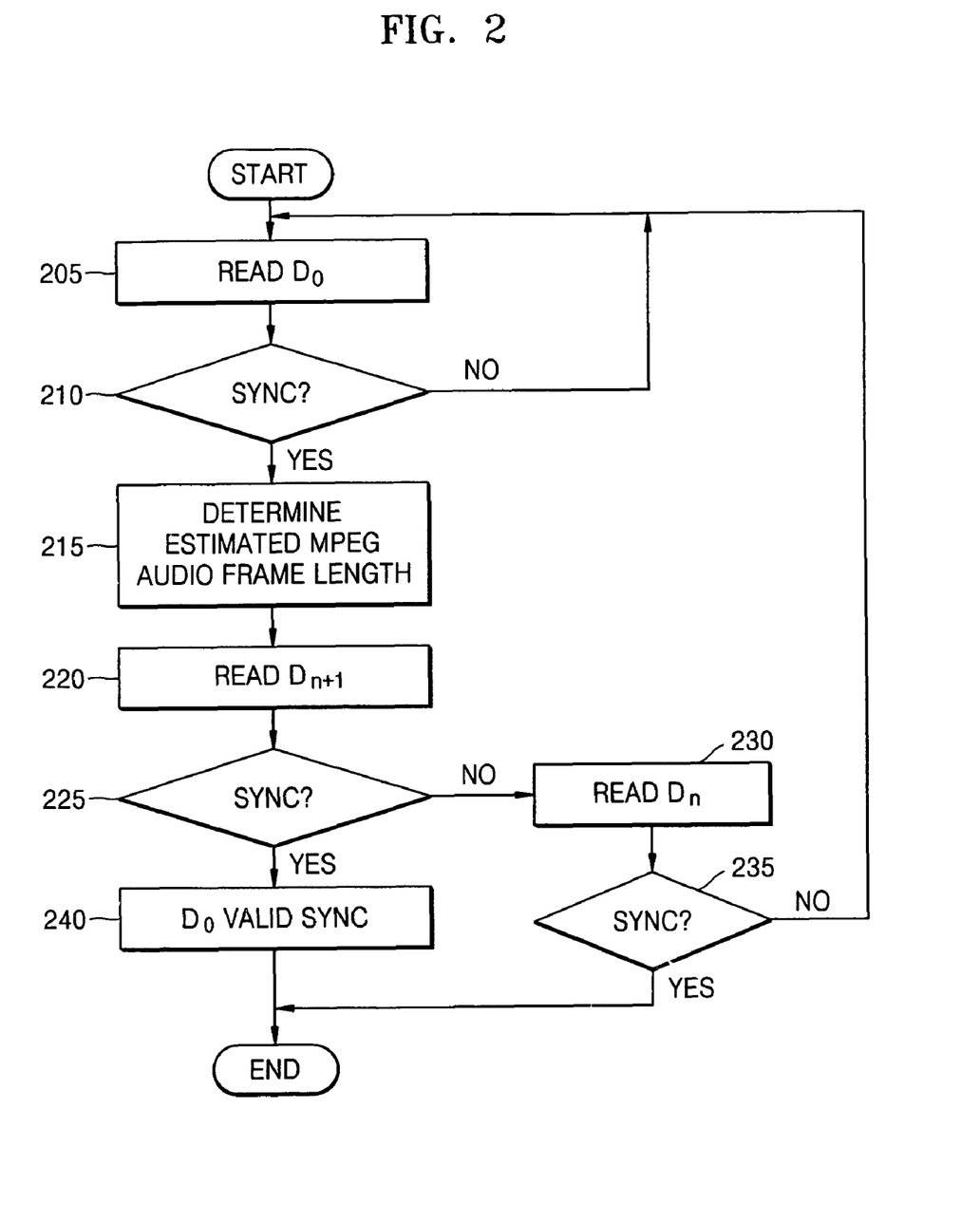
FIG. 2 is a flowchart illustrating embodiments of methods, systems, and computer program products for MPEG decoders according to some embodiments of the invention.

FIG. 2 is a flowchart illustrating embodiments of methods, decoder circuits, and computer program products for MPEG decoders according to some embodiments of the invention. Referring to FIG. 2, first data ($D_0$), referred to herein as a prospective sync word, is read from the MPEG audio bit stream (Block 205) and is tested for a value that is equal to a sync word value (Block 210). In some embodiments according to the invention, the sync word value equals 0xFFF. If $D_0$ is determined to be not equal to the sync word value, the next data from the MPEG audio bit stream is accessed for evaluation (Block 205).

If, however, $D_0$ is determined to be equal to the sync word value (Block 210), in some embodiments according to the invention, an estimated MPEG audio frame length (i.e., size) can be determined according to the following equation:

((Samples Per Frame/8*Bitrate index)/Sampling frequency)

It will be understood that the above-referenced equation used to determine an estimated MPEG audio frame length does not refer to the padding bit included in the MPEG audio frame header (Block 215). In some embodiments according to the invention the MPEG audio frame length is determined based on a table that stores different MPEG audio frame lengths indexed according to the bitrate index and the sampling frequency (Fs) as illustrated, for example, in the table shown in FIG. 5. Other techniques of determining an estimated MPEG audio frame length will be evident to those skilled in the art given the benefit of the present disclosure.

Figure 6:
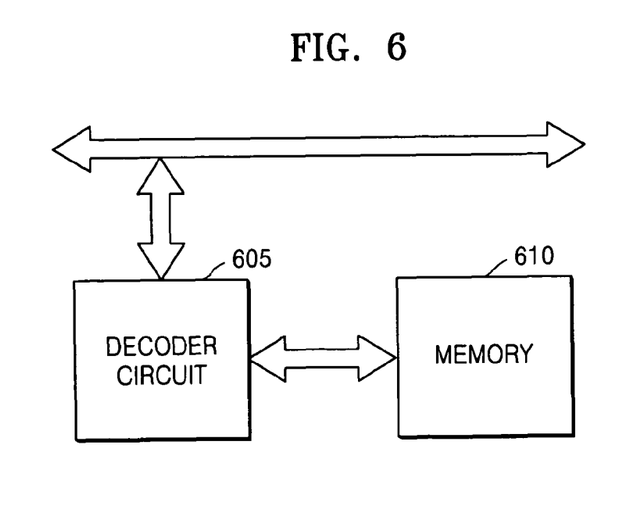
FIG. 6 is a block diagram of a decoder circuit according to some embodiments of the invention.

A decoder circuit can use the estimated MPEG audio frame length to index into the MPEG audio bit stream to access second data $D_{n+1}$ for evaluation as a valid sync word (Block 220). In other words, the decoder circuit can use the estimated MPEG audio frame length to access data which may be the next valid sync word within the MPEG audio frame bit stream, which may depend on whether the data included in the MPEG audio frame is padded or not. It will be understood that the decoder circuit can be embodied in a general purpose processor circuit, an application specific integrated circuit, a digital signal processor circuit, and/or any type of processing circuit capable of decoding data formatted according as an MPEG audio frame. FIG. 6 is block diagram that illustrates a decoder circuit 605 coupled to a memory 610 that can be used to store at least portions of the bitstream data from the MPEG audio frame.

If $D_{n+1}$ has a value equal to the sync word value, the data $D_0$ is determined to be a valid sync word (Block 240). If however, $D_{n+1}$ is not equal to the sync word value (Block 225), the decoder accesses the previous byte in the MPEG audio bit stream $D_n$ (Block 230). If $D_n$ has a value equal to the sync word value (Block 235), $D_0$ is estimated to be a valid sync word (Block 240). If $D_n$ has a value that is not equal to the sync word value (Block 235), $D_0$ is determined not to be a valid sync word and processing continues at Block 205.

Figure 3:
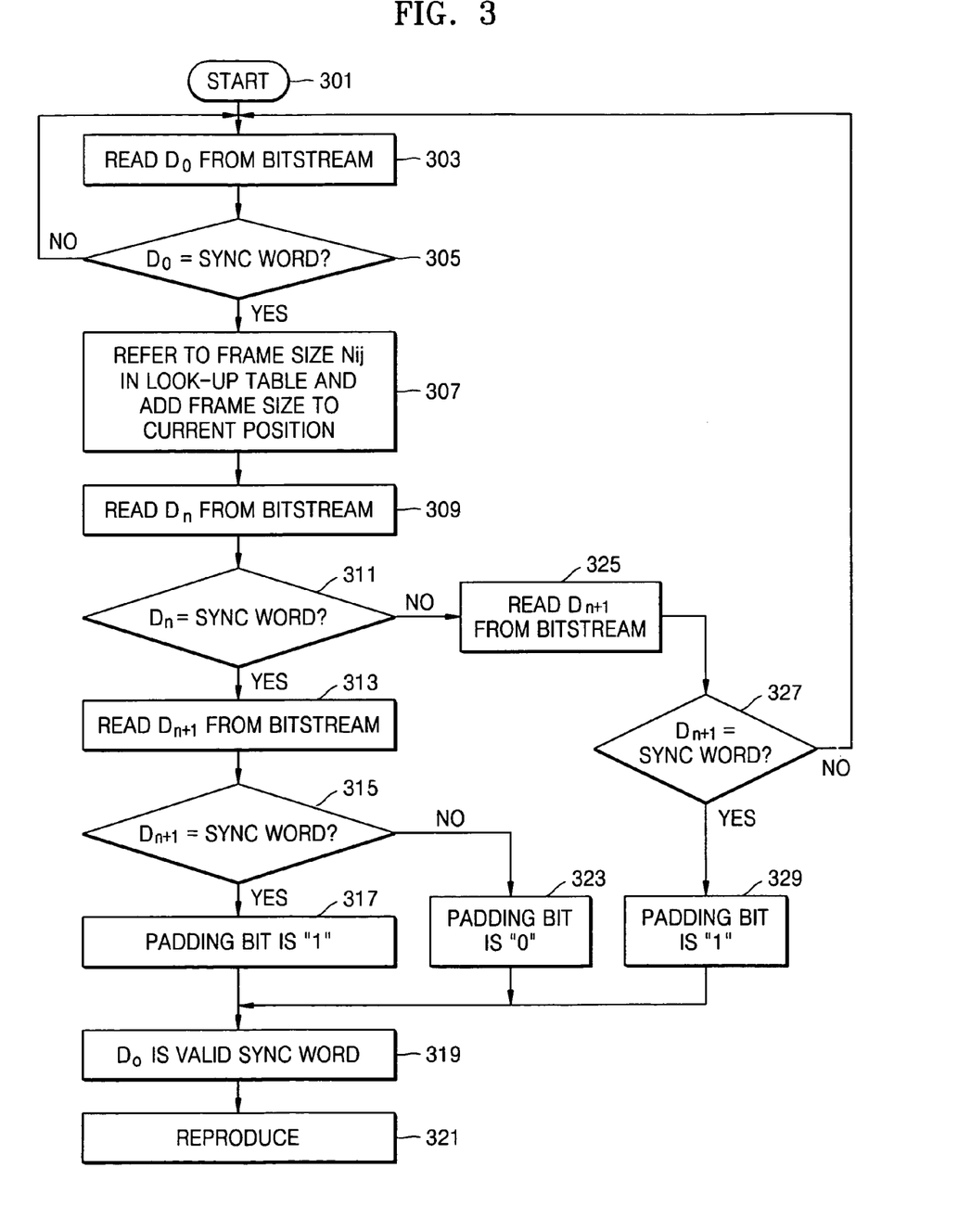
FIG. 3 is a flowchart illustrating embodiments of methods, systems, and computer program products for MPEG decoders according to some embodiments of the invention.

FIG. 3 is a flowchart illustrating embodiments of methods, systems, and computer program products for MPEG decoders according to some embodiments of the invention. The decoder (not shown) receives an audio (or data) bit stream (or compressed audio data) compressed by an encoder (not shown) and reads predetermined first data $D_0$ from the received bit stream in block 303. The decoder bitwise compares the first data $D_0$ with the sync word value to determine whether or not they are equal to each other in block 305. If the first data $D_0$ does not correspond to the sync word value, the decoder reads data adjoining (i.e., the next data) in the bit stream. If the first data $D_0$ equals the sync word value, the decoder refers to a frame size in a look-up table (stored, for example, in a memory or a file), and adds the frame size to the current position of the first data $D_0$ in the bit stream in block 307. In some embodiments according to the invention, the frame size is determined by a combination of the bitrate index field BITRATE INDEX and the sampling frequency field Fs included in the MPEG audio frame header shown in FIG. 1.

The decoder reads second data $D_n$ located at a position in the bit stream that is distant from the current position by the determined frame size in block 309. If the first data $D_0$ is equal to the sync word value, the probability that the second data $D_n$ is a sync word may be relatively high. Accordingly, if at least one of the bitrate index field value and the sampling frequency field value is incorrect (e.g., damaged), the decoder may incorrectly search for the sync word so that a reproducing system including the decoder stops operating or does not operate normally.

In block 311, the decoder determines whether or not the second data $D_n$ is equal to the sync word value. The decoder reads third data $D_{n+1}$ when the second data $D_n$ is determined to be equal to the sync word value in block 313. It will be understood that the third data $D_{n+1}$ is data that temporally and/or spatially adjoining subsequent to the second data $D_n$. In addition, the third data $D_{n+1}$ is used to determine whether or not the first data $D_0$ is a valid sync word.

In the case that the first data $D_0$ is a valid sync word and the audio frame including the first data $D_0$ has been padded, it is very likely that the second data $D_n$ is the additional data for controlling a mean bitrate for the decoder and the third data $D_{n+1}$ is a valid sync word. In other words, if $D_{n+1}$ and $D_0$ are both valid sync words, $D_n$ is likely the data added to the MPEG audio frame as the padding (used to provide a mean bitrate so that the decoder may operate more consistently).

The decoder judges whether or not the third data $D_{n+1}$ is the sync word in block 315. When the third data $D_{n+1}$ is the sync word, the decoder determines that the padding bit is equal to "1" (block 317) and that the first data $D_0$ is a valid sync word in block 319. Accordingly, the decoder may carry out normal decoding operations without use of the padding bit included in the MPEG audio frame header.

When the third data $D_{n+1}$ is not the sync word, the decoder determines that the padding bit is equal to "0" (block 323) and that the first data $D_0$ is a valid sync word in block 319. Accordingly, the decoder may carry out normal decoding operations without use of the padding bit included in the MPEG audio frame header.

Referring to step 311 again, if it is determined that the second data $D_n$ is not the sync word, the decoder reads the third data $D_{n+1}$ from the bitstream (block 325). The decoder determines whether or not the third data $D_{n+1}$ corresponds to the sync word in block 327. When the decoder determines that the third data $D_{n+1}$ corresponds to the sync word, the decoder determines that the padding bit is equal to "1" (block 329) and the first data $D_0$ is a valid sync word in block 319. When the third data $D_{n+1}$ is not the sync word, however, the decoder determines that the first data $D_0$ is not valid sync data (block 327) and continues at block 303 for data adjoining the first data $D_0$.

As described above, it can be known whether the MPEG audio frame including the first data $D_0$ has been padded according to the results of blocks 315 and 327. When the third data $D_{n+1}$ and the sync word correspond to each other, for example, the second data $D_n$ can be deduced to be additional data (i.e., padding) so that the decoder can operate under a steady bitrate (blocks 317 and 329).

Figure 4A:
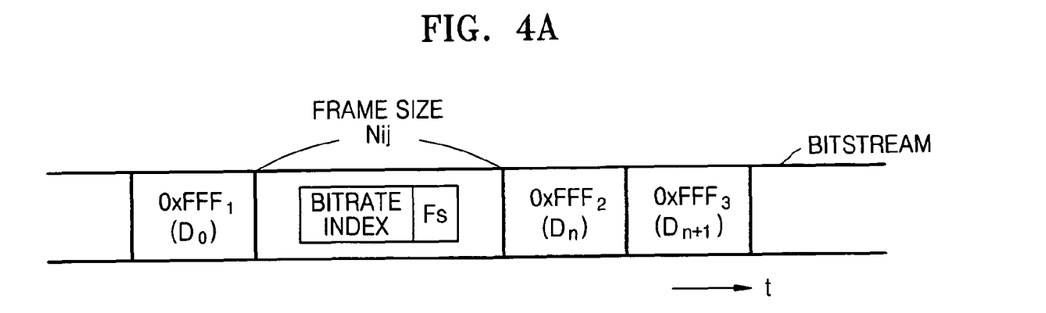
FIGS. 4A to 4D are schematic diagrams illustrating exemplary embodiments of MPEG decoders according to some embodiments of the invention.
Figure 5:
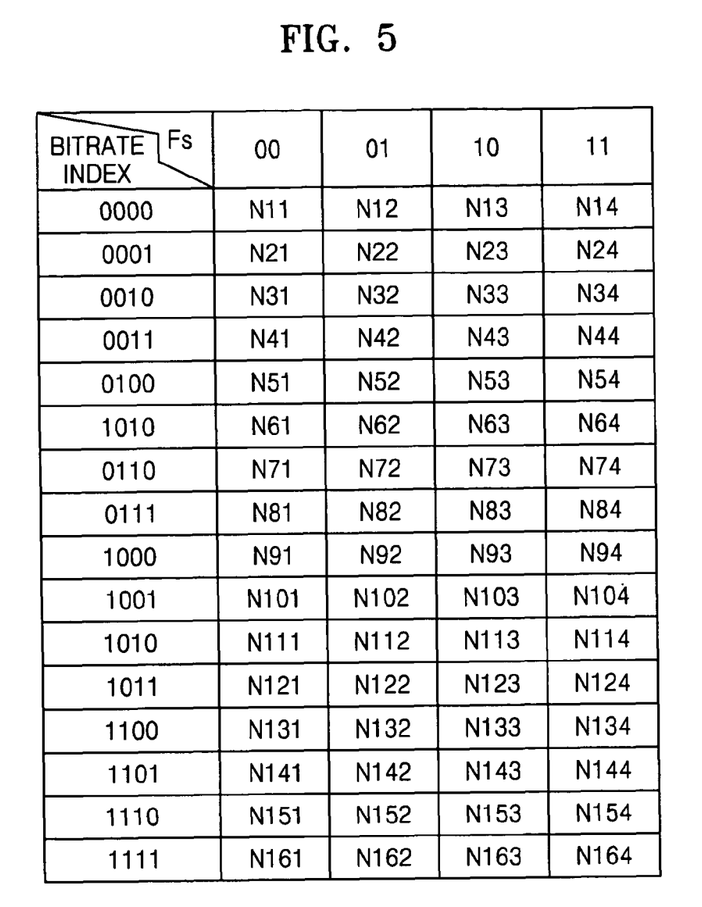
FIG. 5 shows a table of frame sizes Nij determined according to the value of the bitrate index field BITRATE INDEX and the value of the sampling frequency field Fs according to some embodiments of the invention.

FIGS. 3 and 4A illustrate exemplary embodiments according to the invention in which a decoder determines a sync word in an MPEG audio frame without use of the padding bit. The decoder determines if the first data $D_0$($0xFFF_1$) is the sync word value 0xFFF in block 305. Since the first data ($D_0$=0xFFF$_1$) corresponds to the sync word value 0xFFF, the decoder obtains the frame size Nij based on a combination of the value of the bitrate index field BITRATE INDEX and the value of the sampling frequency field Fs fetched from a look-up table, such as that illustrated in FIG. 5. In particular, FIG. 5 shows a table of values of frame sizes Nij determined according to a two dimensional index of the value of the bitrate index field BITRATE INDEX and the value of the sampling frequency field Fs into the table. Here, i is greater than 1 and less than 16 and j is greater than 1 and less than 4. A computer readable medium that stores a program for executing the method of searching for a sync word in a compressed audio bitstream including a plurality of audio frames can be embodied, for example, in a Read-Only-Memory (ROM) or other type of non-volatile (or volatile) storage.

The decoder determines whether or not the second data $D_n$=0xFFF$_2$ that is distant from the first data $D_0$ by the frame size Nij corresponds to the sync word in block 311. Since the second data $D_n$=0xFFF$_2$ corresponds to the sync word, the decoder determines if the third data $D_{n+1}$=0xFFF$_3$ adjoining the second data $D_n$=0xFFF$_2$ corresponds to the sync word in block 315.

The decoder determines the first data $D_0$ to be a valid sync word because the third data $D_{n+1}$=0xFFF$_3$ corresponds to the sync word. Accordingly, it is determined that the second data $D_n$=0xFFF$_2$ is additional data used to pad the MPEG audio frame to control the mean bitrate provided to the decoder. Therefore, it can be concluded that the padding bit (PADDING BIT in the MPEG audio frame header) associated with the first data $D_0$ is "1" in block 317.

Figure 4B:
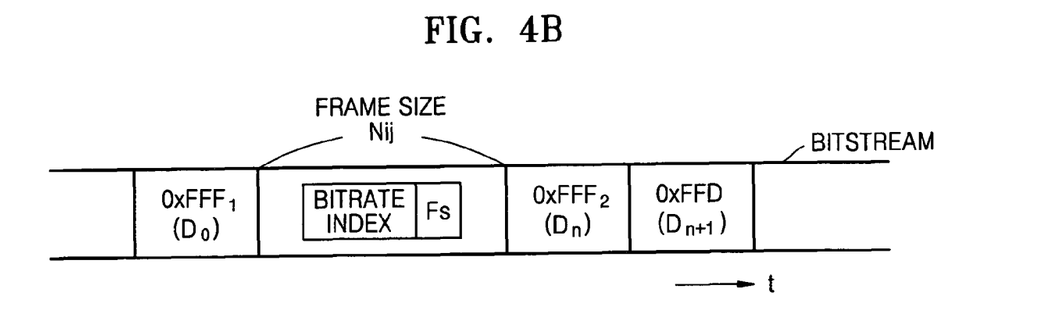

Referring to FIGS. 3 and 4B, the decoder determines the frame size Nij based on a combination of the value of the bitrate index field and the value of the sampling frequency field from the look-up table in FIG. 5 because the first data $D_0$=0xFFF$_1$ corresponds to the sync word 0xFFF. The decoder determines whether or not the second data $D_n$=0xFFF$_2$, distant from the first data $D_0$ by the frame size Nij, corresponds to the sync word in block 311. The decoder determines if the third data $D_{n+1}$=0xFFD is equal to the sync word when the second data $D_n$=0xFFF$_2$ is equal to the sync word in block 315. Since the third data $D_{n+1}$=0xFFD is not equal to the sync word, the decoder determines that the first data $D_0$ is a valid sync word in block 319. Accordingly, the probability that the second data $D_n$ is the sync word is relatively high.

Figure 4C:
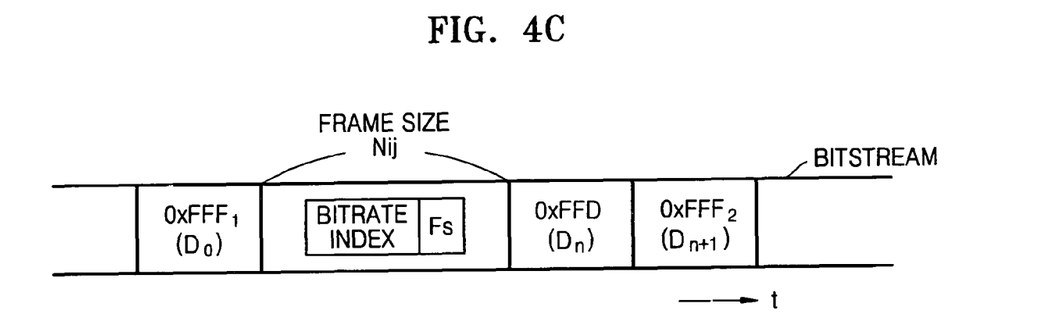

Referring to FIGS. 3 and 4C, the decoder determines the frame size Nij according to a combination of the value of bitrate index field and the value of the sampling frequency field from the look-up table shown in FIG. 5 because the first data $D_0$=0xFFF$_1$ equals to the sync word 0xFFF. The decoder determines whether or not the second data $D_n$=0xFFD is equal to the sync word in block 311. The decoder determines if the third data $D_{n+1}$=0xFFF$_2$ is equal to the sync word in block 327 because the second data $D_n$=0xFFD is not equal to the sync word in block 311. The decoder determines that the first data $D_0$ is a valid sync word since the third data $D_{n+1}$=0xFFF$_2$ is equal to the sync word. Accordingly, the probability that the second data $D_n$=0xFFD is padding data for controlling the mean bitrate to the decoder is relatively high. In the case that the second data $D_n$=0xFFD is the additional data, the associated padding bit of the MPEG audio frame can be deduced to be "1" in block 329.

Figure 4D:
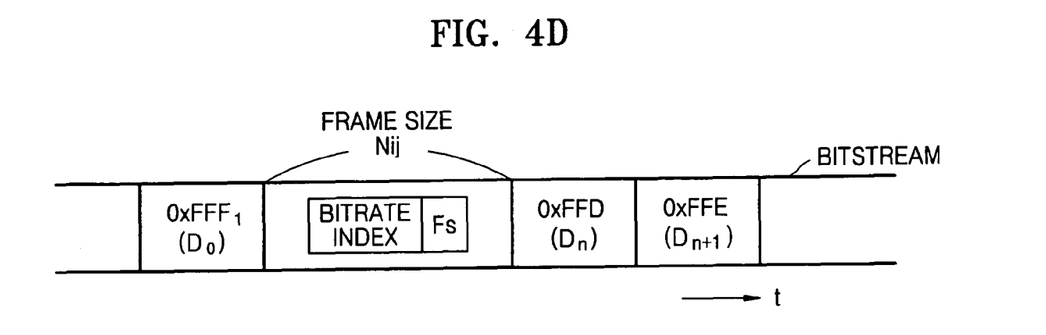

Referring to FIGS. 3 and 4D, the decoder derives the frame size Nij from the look-up table in FIG. 5 because the first data $D_0$=0xFFF$_1$ corresponds to the sync word 0xFFF. The decoder determines whether or not the second data $D_n$=0xFFD corresponds to the sync word in block 311. The decoder determines if the third data $D_{n+1}$=0xFFE corresponds to the sync word because the second data $D_n$=0xFFD does not correspond to the sync word in block 327.

The decoder determines that the first data $D_0$=0xFFF$_1$ is not a valid sync word, but rather, is data having the same pattern (twelve '1's, for example) as that of the sync word 0xFFF because the third data $D_{n+1}$=0xFFE does not correspond to the sync word, and performs the step 303 for data adjoining the first data $D_0$=0xFFF$_1$. In other words, the decoder determines that the first data $D_0$ is not a valid sync word because both $D_{n+1}$ and $D_n$ are not equal to the sync word.

As described above, according to some embodiments of the invention, an MPEG audio frame can be decoded without referring to a padding bit included in a header thereof. For example, in some embodiments according to the invention, the estimated MPEG audio frame length can be determined using other information included in the MPEG audio frame header. The estimated MPEG audio frame length can be used to access subsequent data for comparison to a sync word value. The results of the comparison to subsequent bitstream data can be used to determine an actual MPEG audio frame length.

Contrary to some conventional MPEG decoders, decoders according to some embodiments of the invention may locate valid sync words within the MPEG audio frame without referring to the padding bit included in the MPEG audio frame header. For example, decoders according to some embodiments of the invention may detect first data (which may be a valid sync word) and evaluate whether the first data is a valid sync word by indexing into the MPEG audio bitstream by an amount based on the bitrate index and the sampling rate (included in the header) to access second data (which may be the next sync word). If the second data has a value that is not equal to a sync word, the data which immediately precedes the second data can be evaluated to determine whether it has a value that is equal to the sync word. If the preceding data has a value equal to a sync word, it is determined that the first data is a valid sync word, whereas if the preceding data is not equal to the sync word, the first data is determined not to be a valid sync word.

As described above, the method of searching for a sync word in a compressed audio bitstream and a computer readable medium storing a program for executing the method according to the present invention can search for the sync word correctly and rapidly without reading and thus without depending on the integrity of a padding bit field.

Many alterations and modifications may be made by those having ordinary skill in the art, given the benefit of the present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of searching for a sync word in an MPEG compressed audio bitstream including a plurality of MPEG audio frames, comprising:
    determining whether first data in the bitstream has a value equal to a sync word value;
    determining whether the first data is a valid sync word based on a comparison of a plurality of data that are separated in the bitstream from the first data by at least a frame length to the sync word value;
    adding the frame length to a position of the first data in the bitstream to index to second data in the bitstream;
    comparing the second data to the sync word value; and
    comparing third data in the bitstream that is immediately subsequent to the second data to the sync word value.

2. A method according to claim 1 wherein the frame length is determined based on a bitrate index field value and/or a sampling frequency field value included in a header associated with the bitstream.

3. A method according to claim 1 further comprising:
    determining that the first data is the valid sync word if the second data is equal to the sync word value or if the second data is not equal to the sync word value.

4. A method according to claim 1 further comprising:
    determining that the first data is the valid sync word if the second data is equal to the sync word value and the third data is equal to the sync word value or if the third data is not equal to the sync word value.

5. A method according to claim 1 further comprising:
    determining that the first data is the valid sync word if the second data is not equal to the sync word value and the third data is equal to the sync word value.

6. A method of searching for a sync word in an MPEG compressed audio bitstream including a plurality of MPEG audio frames, comprising:
    comparing subsequent data included in the bitstream to a sync word value, the subsequent data being offset from a prospective sync word by more than an MPEG audio frame length;
    determining that the prospective sync word is a valid sync word if the subsequent data is equal to the sync word value;
    if the subsequent data is not equal to the sync word value, determining that the prospective sync word is the valid sync word if previous data that immediately precedes the subsequent data is equal to the sync word value;
    adding the frame length to a position of the prospective sync word in the bitstream to index to the subsequent data in the bitstream;
    comparing the subsequent data to the sync word value; and
    comparing third data in the bitstream that is immediately subsequent to the subsequent data to the sync word value.

7. A method according to claim 6 wherein the frame length is determined based on a bitrate index field value and/or a sampling frequency field value included in a header associated with the bitstream.

8. A decoder circuit for searching for a sync word in an MPEG compressed audio bitstream including a plurality of MPEG audio frames, comprising:
    a decoder circuit configured to compare subsequent data included in the bitstream to a sync word value, the subsequent data being offset from a prospective sync word by more than an MPEG audio frame length,
    wherein the decoder circuit is further configured to:
        determine that the prospective sync word is a valid sync word if the subsequent data is equal to the sync word value;
        if the subsequent data is not equal to the sync word value, determine that the prospective sync word is the valid sync word if previous data that immediately precedes the subsequent data is equal to the sync word value;
        add the frame length to a position of the prospective sync word in the bitstream to index to the subsequent data in the bitstream;
        compare the subsequent data to the sync word value; and
        compare third data in the bitstream that is immediately subsequent to the subsequent data to the sync word value.

9. A decoder circuit according to claim 8 wherein the frame length is determined based on a bitrate index field value and/or a sampling frequency field value included in a header associated with the bitstream.

10. A non-transitory computer readable medium that has a computer readable program code embodied therein, for searching for a sync word in an MPEG compressed audio bitstream including a plurality of MPEG audio frames, comprising:
    computer readable program code configured to determine whether first data in the bitstream has a value equal to a sync word value;
    computer readable program code configured to determine whether the first data is a valid sync word based on a comparison of a plurality of data that are separated in the bitstream from the first data by at least a frame length to the sync word value;
    computer readable program code configured to add the frame length to a position of the first data in the bitstream to index to second data in the bitstream;
    computer readable program code configured to compare the second data to the sync word value; and
    computer readable program code configured to compare third data in the bitstream that is immediately subsequent to the second data to the sync word value.

11. A non-transitory computer readable medium according to claim 10 wherein the frame length is determined based on a bitrate index field value and/or a sampling frequency field value included in a header associated with the bitstream.

12. A non-transitory computer readable medium according to claim 10 further comprising:
    computer readable program code configured to determine that the first data is the valid sync word if the second data is equal to the sync word value or if the second data is not equal to the sync word value.

13. A non-transitory computer readable medium according to claim 10 further comprising:
    computer readable program code configured to determine that the first data is the valid sync word if the second data is equal to the sync word value and the third data is equal to the sync word value or if the third data is not equal to the sync word value.

14. A non-transitory computer readable medium according to claim 10 further comprising:
    computer readable program code configured to determine that the first data is the valid sync word if the second data is not equal to the sync word value and the third data is equal to the sync word value.

15. A non-transitory computer readable medium that has a computer readable program code embodied therein, for searching for a sync word in an MPEG compressed audio bitstream including a plurality of MPEG audio frames, comprising:
    computer readable program code configured to compare subsequent data included in the bitstream to a sync word value, the subsequent data being offset from a prospective sync word by more than an MPEG audio frame length;
    computer readable program code configured to determine that the prospective sync word is a valid sync word if the subsequent data is equal to the sync word value;
    if the subsequent data is not equal to the sync word value, computer readable program code configured to determine that the prospective sync word is the valid sync word if previous data that immediately precedes the subsequent data is equal to the sync word value;
    computer readable program code configured to add the frame length to a position of the prospective sync word in the bitstream to index to the subsequent data in the bitstream;
    computer readable program code configured to compare the subsequent data to the sync word value; and
    computer readable program code configured to compare third data in the bitstream that is immediately subsequent to the subsequent data to the sync word value.

16. A non-transitory computer readable medium according to claim 15 wherein the frame length is determined based on a bitrate index field value and/or a sampling frequency field value included in a header associated with the bitstream.

* * * * *